United States Patent [19]

Jagelid

[11] Patent Number: 4,930,959
[45] Date of Patent: Jun. 5, 1990

[54] DEVICE FOR MOUNTING DOOR FRAMES, WINDOW FRAMES AND SIMILAR OBJECTS AT AN ADJUSTABLE DISTANCE FROM A SUPPORT STRUCTURE

[76] Inventor: Kjell-inge G. Jagelid, Box 19, Veddige, Sweden, S-430 20

[21] Appl. No.: 296,819

[22] Filed: Jan. 13, 1989

[30] Foreign Application Priority Data

Jan. 13, 1988 [SE] Sweden ............................... 8800086

[51] Int. Cl.$^5$ .................. F16B 35/02; F16B 39/00
[52] U.S. Cl. ..................................... 411/107; 411/383; 411/389; 411/533; 411/999
[58] Field of Search ............... 411/103, 105, 107, 108, 411/21, 383, 384, 389, 40, 41, 45, 178, 533, 970, 999, 60

[56] References Cited

U.S. PATENT DOCUMENTS

| | | | |
|---|---|---|---|
| 1,392,108 | 9/1921 | Bilterman | 411/60 |
| 3,280 874 | 10/1966 | Rosan | 411/178 |
| 3,561,075 | 2/1971 | Selinko | 411/999 |
| 4,391,559 | 7/1983 | Mizusawa | 411/41 |
| 4,486,134 | 12/1984 | White | 411/383 |
| 4,630,984 | 12/1986 | Reinwall et al. | 411/533 |
| 4,640,524 | 2/1987 | Sedlmair | 411/999 |
| 4,673,320 | 6/1987 | Froehlich | 411/45 |

FOREIGN PATENT DOCUMENTS 319495 4/1957 Switzerland ....................... 411/178

Primary Examiner—Neill R. Wilson
Attorney, Agent, or Firm—Fleit, Jacobson, Cohn, Price, Holman & Stern

[57] ABSTRACT

A device for mounting door frames, window frames and similar objects (1) at an adjustable distance from a support structure (2) has a tubular member (3) insertable into a through hole in the supported object (1), a screw means (7) insertable into a hole (6) extending longitudinally through the tubular member (3), the tubular member (3) also including adjacent to a first end portion a restricting surface spaced from a resilient locking means (9), arranged to facilitate axial displacement of the screw head into a contact position with the restricting surface, but preventing withdrawal from this contact position. The second end portion of the tubular member (3) is arranged to form a preferably substantially disc-shaped abutment member (4), restricting the insertable distance of the tubular member (3) into the supported object (1). A portion of the tubular member (3), located adjacent to the abutment member (4), is arranged with means (9) for engagement with the internal surface of the surrounding hole in the supported object (1), said means (9) preferably comprising a screw thread or similar, arranged to be diametrically expanded into said engagement by insertion of the screw (7) into the hole (6) of the tubular member (3).

17 Claims, 2 Drawing Sheets

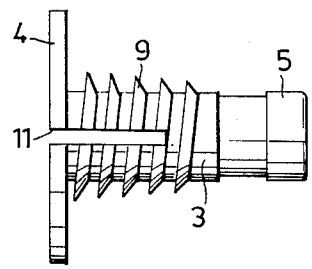
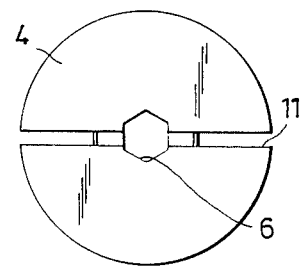
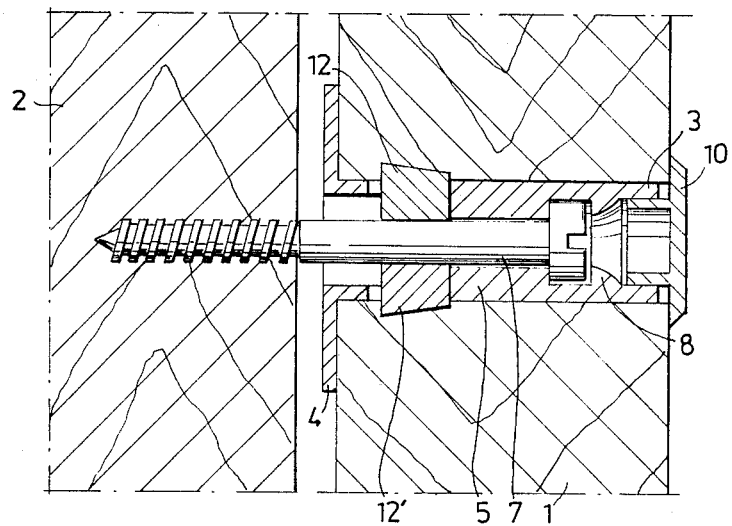
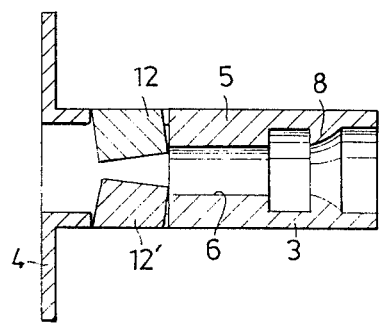

DEVICE FOR MOUNTING DOOR FRAMES, WINDOW FRAMES AND SIMILAR OBJECTS AT AN ADJUSTABLE DISTANCE FROM A SUPPORT STRUCTURE

BACKGROUND OF THE INVENTION

A mounting arrangement for mounting an object to a support structure at a predetermined distance from the latter is disclosed in U.S. Pat. No. 4,182,091 granted Jan. 8, 1980 to Fischer, comprising an expansion sleeve insertable into a hole of the support structure, an expander screw adapted to pass through a hole of the object to be mounted and to be anchored in the expansion sleeve, and a sleeve-shaped spacer member having an inner hole, and adapted to be fitted onto the expander screw and insertable into the object to be mounted. The spacer member has resiliently yieldable elements adapted to be spring-loaded after insertion of the space member into the hole of the object to be mounted, operative for gripping the latter, and also having further elements for fixing the spacer member to the expander screw. Adjustment of a distance at which the object might be mounted relative to the support structure is performed by varying the depth of threading for the expander screw into the expansion sleeve. A similar arrangement is also disclosed in SE, A, 449,637, filed Sept. 2, 1985 by Thorsman & Co AB.

However, these types of spacer members are arranged with the gripping elements arranged to take up contact with two opposed surfaces of the object to be mounted, i.e. that this object must have a cross-sectional depth strictly conforming to the distance between the gripping elements. These types of spacer members can be regarded as acceptable when used for mounting metal sections, which have a cross-sectional wall thickness manufactured within close tolerances, and also hard surface properties.

U.S. Pat. No. 3,667,338 granted June 6, 1972 to Johansson, discloses a device for adjustable spaced interconnection of two elements, comprising a screw member to be screwed into the supporting element, and having an externally screw threaded tubular nut member surrounding the head of the screw member, arranged to be screwed into the other element. The tubular nut member is arranged rotatable in relation to the screw member, while maintaining a relative axial position in relation thereto. This device can be used for adjustable spaced interconnection of a wooden door or window frame to a support structure. However, since adjustment involves a relative displacement movement of the supported element in relation to the tubular nut member when same is rotated in relation to the screw, a repeated adjustment operation will damage the screw thread formed in the supported element during the attachment of the nut member. As a result, the screw thread connection established between the nut member and the supported element may no longer hold the supported element in desired position, or facilitate desired adjustment in relation to the supporting element. Furthermore, attachment/adjustment of this device can only be performed with a special purpose tool.

SUMMARY OF THE INVENTION

Accordingly, it is an object of the present invention to provide a novel device for mounting door frames, window frames and similar objects at an adjustable distance from a support structure, facilitating attachment of non-metallic objects, e.g. wooden frames, permitting repeated adjustment without endangering the attachment properties between the device and the attached object.

A further object of the present invention is to provide a device for the above purpose which includes a conventional and commercially available screw as an essential element, thereby easily modified with regard to attachment length in the supporting structure, also with regard to space between the supporting structure and the adjustably mounted object.

Another feature of the present invention is that the device includes a tubular member, preferably manufactured from a plastics material, which reduces manufacturing costs, but also results in advantages with regard to resistance against corrosion.

An essential advantage of the present invention is that the device can be attached and adjusted with use of conventional tools.

Still another object of the present invention is to provide a device which does not extend beyond the the external surface of the object to be attached.

The novel features which are considered as characteristic for the invention are set forth in particular in the appended claims. The invention itself, both as to its construction and its method of operation, together with additional objects and advantages thereof, will be best understood from the following description of specific examplary embodiments when read in connection with the accompanying drawings.

BRIEF DESCRIPTION OF THE DRAWINGS

FIG. 5 is a side view of a further modified tubular member;

FIG. 6 is an end view of the tubular member shown in FIG. 5, showing the end surface having a larger diameter;

FIG. 7 is a view in logitudinal section, showing a further example of an embodiment of a device according to the present invention, arranged to adjustably interconnect an object and a support structure;

FIG. 8 is a view in longitudinal section of the tubular member shown in FIG. 7.

GENERAL DESCRIPTION

Figure 1:
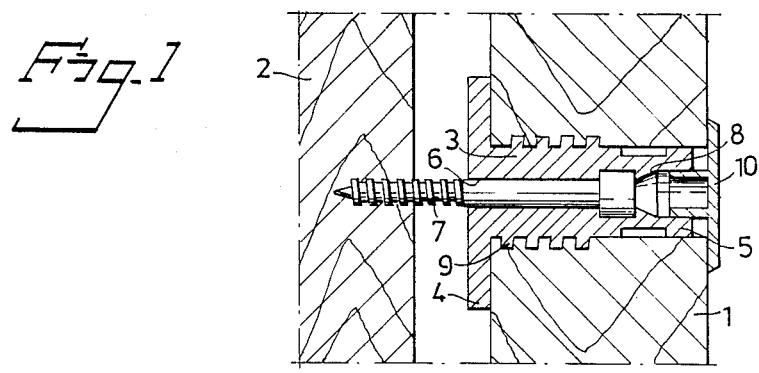
FIG. 1 is a view in longitudinal section of a frame member adjustably mounted to a support structure by means of an examplary first embodiment of a device according to the present invention.

FIG. 1 shows a first example of an embodiment of a device according to the present invention, arranged to support an object 1, hereinafter referred to as a frame member, in a spaced relationship to a support structure 2, hereinafter referred to as a wall element.

Figure 2:
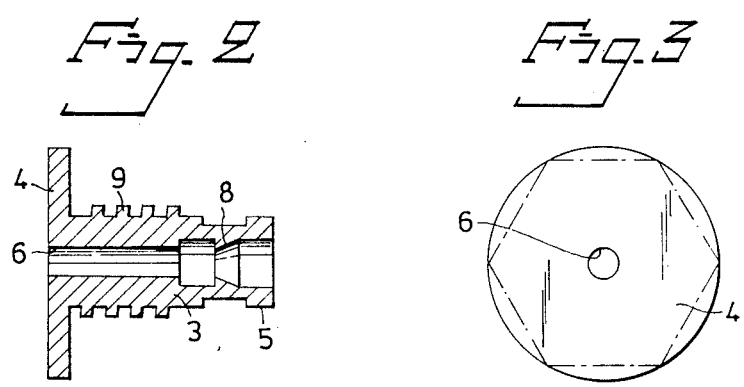
FIG. 2 is a view in longitudinal section of a tubular member included in the embodiment shown in FIG. 1.
Figure 3:
FIG. 3 is an end view of the tubular member shown in FIG. 2, showing the end surface having a larger diameter, and also indicating an alternative configuration.
Figure 4:
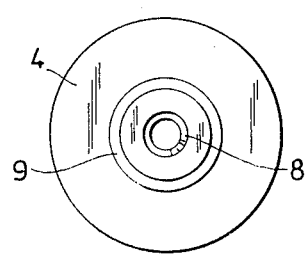
FIG. 4 is an end view of the tubular member shown in FIG. 2, showing the end portion having a smaller diameter.

The device comprises a tubular member, as a complete unit denominated 3, which is shown more in detail in FIGS. 2–4. One end portion is arranged as a disc-shaped member 4 having an enlarged area, in use intended to be located by the surface of the frame member 1 which is located nearby the surface of the wall element 2. The tubular member 3 is arranged with a guiding portion 5 and a centrally located through hole 6, into which a screw 7 is insertable. In direction from the disc-shaped member 4, the through hole 6 is transformed into a portion having an enlarged diameter, corresponding to or exceeding the diameter of the head of the screw 7, and after a distance corresponding to, or slightly exceeding, the height of the screw head, a substantially conical resiliently yieldable stop member 8 is arranged, which alternatively may comprise of a ring-shaped annular part or of a number of individual members having a ringshaped location. In direction towards the through hole 6, said conical stop member 8 has a restricting surface extending substantially transversely in relation to the length axis of the tubular member 3, and from this transversely extending surface, an outwardly inclined surface extends. Finally, the tubular member 3 also includes an external screw threaded portion 9, extending from the disc-shaped member 4, and advantegously arranged having a pitch with opposed direction of extension relative the pitch of the screw 7, i.e. left-hand threaded when a screw 7 with conventional right-hand threaded screw pitch is used.

When used, a mounting hole is first drilled in the frame member 1 with a diameter adapted to suit the external diameter of the tubular member 3. For applications in which the material of the wall element 2 requires the use of expansion sleeves for attachment of utilized screws 7, it is possible to drill the holes required for such expansion sleeves in the same operation, or to mark the location for such holes. Prior to positioning the frame member 1 in the attachment location, previously described tubular members 3 are inserted from the surface plane to be located closest to the surface of the wall element 2 into the mounting holes taken up in the frame member 1, whereby the disc-shaped member 4 is located adjacent to said surface plane. In order to completely insert a tubular member 3 into a hole taken up in the frame member 1, the tubular member 3 is advantageously screwed into said hole. Such an operation is easily performed, for example by arranging the disc-shaped member 4 with a multisided external configuration, e.g. a hexagonal configuration as indicated with broken lines in FIG. 2, or by arranging the through hole 6 with a multisided cross-sectional shape, preferably hexagonal, whereby a conventional Allen wrench can be used for the mounting operation.

It should also be mentioned, that the frame member 1 obviously can be arranged with a countersunk portion in the plane adjacent to the wall element 2 (not shown), having a depth and a diameter substantially corresponding to the height and size of the disc-shaped member 4, in order to accomplish a substantially smooth and level surface between the frame member 1 and the disc-shaped member 4.

The frame member is thereafter mounted in desired location with use of wedges or similar, whereafter the screws 7, intended to establish the attachment, are applied. Each screw 7 is tightened substantially completely, and during the final part of this operation, the head of the screw 7 will pass the conical members 8, and thus be located between two restricting surfaces, defined by the bottom portion from which the hole 6 extends and the transversely extending surface of the conical members 8. By arranging the hole 6 in the tubular member 3 with a diameter smaller than the area of the screw body, insertion and tightening of the screw 7 causes the externally threaded portion 9 to be further anchored in relation to the frame member 1 due to diametrical expansion of the tubular member 3, causing the threaded portion 9 to be further pressed against the surface of the surrounding hole in the frame member 1. Provided that said threaded portion 9 has been arranged having a pitch extending in opposed direction relative the pitch of the screw 7, complete security will be obtained for a total tightening operation for the tubular member 3 in relation to the frame member 1, since any rotary movement transferred from the screw 7 to the tubular member 3 only will result in additional anchoring of the tubular member 3.

Accordingly, the tubular member 3 is now well anchored to the frame member 1, since it on one hand is prevented from performing an axial displacement movement from the surface located adjacently to the wall member 2 by means of the disc-shaped member 4, and on the other hand is prevented from performing an axial displacement movement in the opposed direction due to the interconnecting grip established by means of the outwardly expanded threaded portion 9, which advantageously is arranged with a screw thread having good attachment properties minimizing the risk for withdrawal from the frame member 1, e.g. with a ground down thread section having a substantially square or rectangular cross-section, or with a screw thread section in which the surface closest to the disc-shaped member 4 extends in a substantially perpendicular relationship to the length axis of the tubular member 3. Since now the head of associated screw 7 now is also fixed relative axial displacement in relation to the tubular member 3, due to its location between two restricting surfaces, a rotary movement of the screw in alternative rotary directions results in a displacement movement of the frame member 1 in direction to/from the wall member 2 corresponding to the axial movment of the screw 7.

In order to remove the wedges or similar means used to hold the frame member 1 temporarily during the mounting operation, the screws 7 are now slightly untightened, whereafter final adjustment of the position of the frame member 1 is performed by tightening/untightening the screws 7 as required. When the adjustment has been completed, a covering lidshaped member 10 is advantageously attached at the open portions of the holes in the frame member 1, and such lidshaped members 10 may, as shown, be arranged extending to a position seized by the tubular member, or be arranged in contact with the internal surface of an outer portion of the holes.

The tubular member 3 is advantageously manufactured from a plastics material as a single and integral unit. This results in a simple and low cost unit in combination with a conventional screw 7. When the hole 6 in the tubular member 3 is arranged having a hexagonal cross-sectional configuration, an Allen screw 7 is preferably used, i.e. with a screw head having a female hexagonal portion, whereby one wrench only can be used to attach the tubular member 3 to the frame member 1 and also to mount/adjust the screw 7.

In order to improve the gripping properties between the tubular member 3 and the frame member 1, the tubular member 3 may advantageously be arranged including at least one through slot 11, extending from the end portion by which the disc-shaped member 4 is arranged, and an example of such a modification is shown in FIGS. 5 and 6. These Figures disclose how a through slot 11 has been taken up in longitudinal direction of the tubular member 3, and with an extension smaller than the length of the tubular member 3. Since the existance of one or a number of such slots 11 makes it possible to reduce the external diameter of the tubular member 3 when same is inserted into a surrounding hole, this embodiment also facilitates that the externally screw threaded portion 9 is given a larger diameter by the portion located adjacent to the disc-shaped member 4, e.g. with a gradually increased diameter, as shown in FIG. 5. As a result, a further improved contact between the screw threaded part and the mounting hole is accomplished, while a uniform cross-sectional configuration for the hole 6 is maintained. Obviously, a similar improved contact can be obtained by arranging the hole 6 with a reduced diameter by a portion close to the disc-shaped member 4, but such a varied diameter may result in a reduction of the guiding length for the screw 7 in the hole 6. In the examplary embodiment shown in FIGS. 5 and 6, the slot 11 is arranged to divide part of the tubular member 3 into two parts. However, the slot 11 may also be arranged to extend radially from the center axis in only one direction, and a number of such slots 11 can also be used, e.g. arranged to divide a portion of the tubular member 3 into three, four or more parts. Furthermore, such slots 11 may obviously also be used for a screw threaded portion 9 having a substantially uniform external diameter. It should also be mentioned, that a slot 11, e.g. as shown in FIGS. 5 and 6, obviously also can be used to interconnect with a tool when mounting the tubular member 3 in a frame member 1, e.g. when the hole 6 in the tubular member 3 has been arranged having a cylindrical cross-sectional configuration, and when the disc-shaped member 4 also has been arranged having a cylindrical configuration, and neither the hole 6, nor the disc-shaped member 4, have been arranged to facilitate interconnection with a mounting tool.

The extremely good attachment and tensile properties offered by a device according to the present invention will now be discussed, with reference to the embodiment shown in FIGS. 5 and 6.

A tubular member 3 was manufactured from diethylacetal, and with the externally screw threaded portion 9 having a M15 screw thread (left-hand threaded) with a threaded length of 18 mm. The head of the screw 7 was held against withdrawal by means of an internal conical member 8, being six individual parts in a ring-shaped configuration with the extension towards the center axis of the tubular member 3 being so restricted (0.5–1.0 mm) that the screw head would pass same when the screw 7 was tightened. Initially, a force was applied against the screw 7, arranged to cause a displacement movement of the screw 7 out from the tubular member 3, in order to determin the holding force established by the aforementioned conical member 8, and this force was found to be 920 N. Thereafter, the tensile strength of the external screw threaded portion 9 was determined, but before mounting, the screw thread was made subject to a grinding operation resulting in a screw thread with a substantially square cross-sectional configuration along the entire length of the threaded portion 9. The tubular member 3 was mounted in a frame member 1 manufactured from dry Swedish pinewood, whereafter necessary force to withdraw the tubular member 3 in a direction opposed to the mounting direction was measured, and the required force was found to be 3700 N.

The results indicated above relate to a prototype embodiment, and these results may thus be further improved by means of certain modifications, e.g. by means of the modifications described above for obtaining an improved contact against the mounting hole into which the tubular member 3 is inserted.

With regard to the embodiments described, reference has been made to an external screw threaded portion 9. However, this term (screw thread) may also include portions having a substantially similar configuration, e.g. a portion formed by means of adjacently located annular and outwardly or inwardly directed formations, arranged to be forced into contact with the internal wall surface of a hole into which the tubular member 3 has been inserted by means of a substantially linear displacement before being diameterically expanded by means of the screw 7.

It is also possible to include additional members 12, 12′ as shown in FIGS. 7 and 8. In this embodiment, the tubular member 3 is arranged with short through slots, in which wedgeshaped gripping members 12, 12′ are located. These members are located in the position of FIG. 8 when the tubular member 3 is inserted into the hole taken up in the frame member 1, and when the screw 7 is inserted into the hole 6, these members 12, 12′ expand radially into the frame member 3, thereby anchoring the tubular member 3 against withdrawal from the frame member 1. The number of such additional members 12, 12′ can be varied as desired, but two or four such members 12, 12′ are normally sufficient to obtain extremely good attachment properties. These additional members 12, 12′ are as a rule manufactured from metal, but may also comprise of tongueshaped members, formed integral with the tubular member 3, normally having the free end portion located directed towards the disc-shaped member 4.

The embodiments shown and described only serve as examples of embodiments within the scope of the inventive thought and the attached claims, and as indicated above, features of the invention and described embodiments can be combined as desired to suit the requirements of any application.

I claim:

1. A device for adjustably interconnecting an object and a support structure, comprising:
   a tubular member for insertion into a hole in the object and having a central bore for receiving a screw therein;
   a first end portion provided with means for rotatably locking the head of a screw against longitudinal movement in the bore;
   a second end portion provided with abutment means extending radially of the tubular member for abutting against the surface of the object surrounding the hole in which the tubular member is received; and
   diametrically expandable engagement means on a portion of the tubular member adjacent the abutment means for engaging with the interior of the hole in the object, which engagement means is diametrically expandable by inserting a screw into the central bore of the tubular member.

2. The device according to claim 1, wherein the engagement means comprises an external screw thread on the tubular member.

3. The device according to claim 2, wherein the screw thread is left-handed.

4. The device according to claim 2, wherein the screw thread has a rectangular cross section.

5. The device according to claim 1, wherein the engagement means comprises a plurality of external circumferentially extending formations spaced along the length of the tubular member.

6. The device according to claim 5, wherein the formations have a rectangular transverse cross section.

7. The device according to claim 1, wherein the abutment means comprises a circular flange.

8. The device according to claim 1, wherein the abutment means comprises a polygonal flange.

9. The device according to claim 1, wherein the tubular member is provided with a diametrical slot extending along part of the length of the tubular member from the end portion provided with the abutment means and dividing a part of the tubular member into individual portions.

10. The device according to claim 1, wherein the central bore has a polygonal cross section.

11. The device according to claim 10, wherein the central bore has a hexagonal cross section.

12. The device according to claim 1, wherein the central bore has a smaller diameter in a portion thereof adjacent the abutment means compared with the diameter of the rest of the bore.

13. The device according to claim 1, wherein the tubular member has an increased external diameter in a region adjacent the abutment means.

14. The device according to claim 1, wherein the diametrically expandable engagement means comprises a plurality of radially expandable members on the tubular member adjacent the abutment means, which members are expandable to project from the outer surface of the tubular member by inserting a screw into the central bore of the tubular member.

15. The device according to claim 1, wherein the locking means comprises a circumferential shoulder in the central bore and a resilient member spaced from the shoulder for engaging the head of a screw between the shoulder and the resilient member.

16. A combination of the device according to claim 2 and a screw for insertion into the central bore of the tube of the tubular member, wherein the direction of the external screw thread on the tubular member is opposite to the direction of the thread on the screw.

17. A combination of the device according to claim 1 and a screw for insertion into the central bore of the tubular member, wherein the screw has a shank with a diameter which is greater than the diameter of the central bore in a portion of the tubular member adjacent the abutment means.

* * * * *